US011102645B2

United States Patent
Kim et al.

(10) Patent No.: US 11,102,645 B2
(45) Date of Patent: Aug. 24, 2021

(54) NETWORK REGISTRATION METHOD OF INTERNET OF THINGS DEVICE, AND DEVICE THEREFOR

(71) Applicant: SAMSUNG ELECTRONICS CO., LTD., Suwon-si (KR)

(72) Inventors: Jin Yup Kim, Yongin-si (KR); Han Jib Kim, Suwon-si (KR); Sun Key Lee, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/650,193

(22) PCT Filed: Sep. 21, 2018

(86) PCT No.: PCT/KR2018/011292
§ 371 (c)(1),
(2) Date: Mar. 24, 2020

(87) PCT Pub. No.: WO2019/066424
PCT Pub. Date: Apr. 4, 2019

(65) Prior Publication Data
US 2020/0221293 A1    Jul. 9, 2020

(30) Foreign Application Priority Data
Sep. 26, 2017  (KR) .................. 10-2017-0123886

(51) Int. Cl.
*G06F 1/24*     (2006.01)
*H04W 4/70*    (2018.01)
(Continued)

(52) U.S. Cl.
CPC ......... *H04W 8/265* (2013.01); *H04L 61/6054* (2013.01); *H04W 4/80* (2018.02);
(Continued)

(58) Field of Classification Search
None
See application file for complete search history.

(56) References Cited

U.S. PATENT DOCUMENTS 10,454,606 B2   10/2019  Xue et al.
2016/0374134 A1  12/2016  Kweon et al.
(Continued)

FOREIGN PATENT DOCUMENTS

EP    3 128 475      2/2017
JP    2008-078881    4/2008
(Continued)

OTHER PUBLICATIONS

Extended European Search Report dated Aug. 31, 2020 in counterpart EP Application No. 18860524.0.
(Continued)

*Primary Examiner* — Gary Lafontant
(74) *Attorney, Agent, or Firm* — Nixon & Vanderhye, P.C.

(57) ABSTRACT

Disclosed is an external electronic device for enabling an Internet of Things-supporting device to subscribe to a network. The external electronic device, according to the present disclosure, may provide, on a display thereof, an interface enabling the subscription of an Internet of Things device which does not comprise a separate display. In addition, the external electronic device, according to the present disclosure, may perform, via an external server, the subscription of the Internet of Things device to an Internet of Things service provider. In addition, various embodiments are possible as identified in the specification. In addition, various embodiments are possible as identified in the specification.

15 Claims, 12 Drawing Sheets

(51) Int. Cl.
  *H04W 8/26* (2009.01)
  *H04W 4/80* (2018.01)
  *H04L 29/12* (2006.01)
  *H04W 8/18* (2009.01)
  *H04W 8/24* (2009.01)
  *H04W 60/00* (2009.01)
  *H04W 88/06* (2009.01)

(52) U.S. Cl.
  CPC ............ *H04W 8/183* (2013.01); *H04W 8/24* (2013.01); *H04W 60/00* (2013.01); *H04W 88/06* (2013.01)

(56) References Cited

U.S. PATENT DOCUMENTS

| | | |
|---|---|---|
| 2017/0041304 A1 | 2/2017 | Tal et al. |
| 2017/0163685 A1* | 6/2017 | Schwartz ............... H04L 63/20 |
| 2017/0180095 A1 | 6/2017 | Xue et al. |
| 2017/0265156 A1 | 9/2017 | Xue et al. |
| 2018/0027458 A1* | 1/2018 | Mohan .................. H04W 48/08 370/331 |
| 2018/0160453 A1 | 6/2018 | Lee et al. |
| 2018/0206253 A1 | 7/2018 | Yun et al. |
| 2018/0212726 A1 | 7/2018 | Xue et al. |
| 2020/0073452 A1* | 3/2020 | Isberg .................... H04W 4/70 |

FOREIGN PATENT DOCUMENTS

| | | |
|---|---|---|
| JP | 2012-216980 | 11/2012 |
| KR | 10-2009-0037186 | 4/2009 |
| KR | 10-2015-0124741 | 11/2015 |
| KR | 10-2017-0012150 | 2/2017 |
| KR | 1737806 | 5/2017 |
| KR | 10-2017-0088203 | 8/2017 |
| WO | 2016/208960 | 12/2016 |

OTHER PUBLICATIONS

"3rd Generation Partnership Project; Technical Specification Group Services and System Aspects; Study on the security aspects of the next generation system (Release 14)," 3GGP TR 33.899 V1.3.0, Aug. 2017, 605 pages.

International Search Report for PCT/KR2018/011292, dated Jan. 17, 2019, 4 pages.

Written Opinion of the ISA for PCT/KR2018/011292, dated Jan. 17, 2019, 8 pages.

* cited by examiner

NETWORK REGISTRATION METHOD OF INTERNET OF THINGS DEVICE, AND DEVICE THEREFOR

This application is the U.S. national phase of International Application No. PCT/KR2018/011292 filed 21 Sep. 2018, which designated the U.S. and claims priority to KR Patent Application No. 10-2017-0123886 filed 26 Sep. 2017, the entire contents of each of which are hereby incorporated by reference.

TECHNICAL FIELD

The present disclosure relates to network registration of a mobile internet-of-things device.

BACKGROUND ART

The Internet is evolving from a human-oriented connection network in which humans generate and consume information, to an internet-of-things (IoT) network in which distributed components, such as things, exchange and process information. Under the IoT network, intelligence Internet technology (IT) services may be provided to collect and analyze data generated from things and to create new values in a human life.

In general, electronic devices, which may belong to the IoT, have a relatively lower processing ability and a lower battery capacity. In addition, since various things are connected with a network, more many electronic devices may be connected with the network as compared to communication equipment such as an existing telephone. In addition, the above-described characteristic of the IoT may be identically applied to machine type communication. Accordingly, there may be required a communication method based on the characteristics, such as lower power consumption and multiple accesses, of the IoT and the machine type communication.

DISCLOSURE

Technical Problem

IoT communication may be performed based on a cellular network. For example, the IoT communication may be performed through a low power wide area network (LPWAN) based on the cellular network. For example, the LPWAN may include networks based on various communication standards, such as category-machine (Cat-M), narrowband-IoT (NB-IoT) or extended coverage GSM for IoT (EC-GSM). To perform the IoT communication based on the cellular network, the electronic device may be first signed in to a network service provider of a cellular network.

In general, the IoT device may be produced with a longer battery lifespan at lower costs. Accordingly, the IoT device may have limited functionality. For example, the IoT device may have lower data throughput in uplink and downlink. For another example, the IoT device may support only half-duplex communication. For another example, the IoT may not include a component, such as a display, for displaying complex information. For another example, the IoT may include only a user interface such as a simple physical button to receive a user input. Accordingly, there is required a method for signing in the IoT device to a network through a simple user interface such as a physical button.

Aspects of the present disclosure are to address at least the above-mentioned problems and/or disadvantages and to provide at least the advantages described below. Accordingly, an aspect of the present disclosure is to provide a method and a device for registering an IoT device in a network.

Technical Solution

In accordance with an aspect of the present disclosure, an electronic device may include a first wireless communication circuit to provide first wireless communication using a lower power wide area network (LPWAN), a second wireless communication circuit to provide second wireless communication by using Wi-Fi, a third wireless communication circuit to provide a third wireless communication by using Bluetooth Low Energy (BLE), a user interface, a processor, and a memory. The processor may be operatively connected with the first wireless communication circuit, the second wireless communication circuit, the third wireless communication circuit, and the user interface, and the memory. The memory may store instructions that, when executed, cause the processor to transmit, to the LPWAN, a request for access to a network through the first wireless communication circuit, to receive a response indicating a rejection of the request from the LPWAN through the first wireless communication circuit, to receive a user input through the user interface after receiving the response, to provide device registration information to an external mobile device by using the third communication circuit when the user input is received, to receive network state information from the external mobile device after providing the device registration information, and to reboot the electronic device.

In accordance with another aspect of the present disclosure, an internet of things (IoT) device may include a housing, a communication circuit provided in the housing to provide first wireless communication using an LPWAN and second wireless communication using BLE, a physical button exposed through a portion of the housing, an indicator exposed through the portion of the housing, and a processor provided in the housing and electrically connected with the communication circuit, the physical button, and the indicator. The processor may be configured to receive a first message from an external mobile device through the second wireless communication by using the communication circuit, to display a notification indicating reception of the first message through the indicator, to receive a user input to the physical button after displaying the notification, to transmit, to the external mobile device, device registration information through the second wireless communication by using the communication circuit, so as to register the IoT device in the LPWAN, when the user input is received, to receive a second message associated with the LPWAN from the external mobile device through the second wireless communication by using the communication circuit, after transmitting the device registration information, and to access the LPWAN through the second wireless communication by using the communication circuit, based at least on the second message.

In accordance with another aspect of the present disclosure, an electronic device may include a communication circuit to provide first wireless communication using a cellular network, second wireless communication using a WLAN, and third wireless communication using BLE, a display, and a processor electrically connected with the communication circuit and the display. The processor may be configured to receive registration information including an identifier of the first external electronic device through the third wireless communication from the first external electronic device by using the communication circuit, to transmit, to the second external electronic device, the registration information through the first wireless communication or the second wireless communication, by using the communication circuit, to receive, from the second external electronic device, first network state information of the first external electronic device through the first wireless communication or the second wireless communication, by using the communication circuit, and to display, on the display, a user interface for registration of the first external electronic device in an LPWAN based at least on the first network state information.

Advantageous Effect

As described above, according to various embodiments disclosed in the present disclosure, the IoT device may be signed in through an external electronic device communicating with the IoT device through a short-range wireless network.

In addition, according to various embodiments, various requirements depending on service providers may be processed by an external server by transmitting registration information to a service provider server through an external server.

Besides, a variety of effects directly or indirectly understood through the present disclosure may be provided.

DESCRIPTION OF DRAWINGS

In the following description made with respect to the accompanying drawings, similar components will be assigned with similar reference numerals.

MODE FOR INVENTION

Hereinafter, various embodiments of the present disclosure may be descr ibed with reference to accompanying drawings. Accordingly, those of ordinary skill in the art will recognize that modification, equivalent, and/or alternative on the various embodiments described herein can be variously made without departing from the scope and spirit of the present disclosure.

Figure 1:
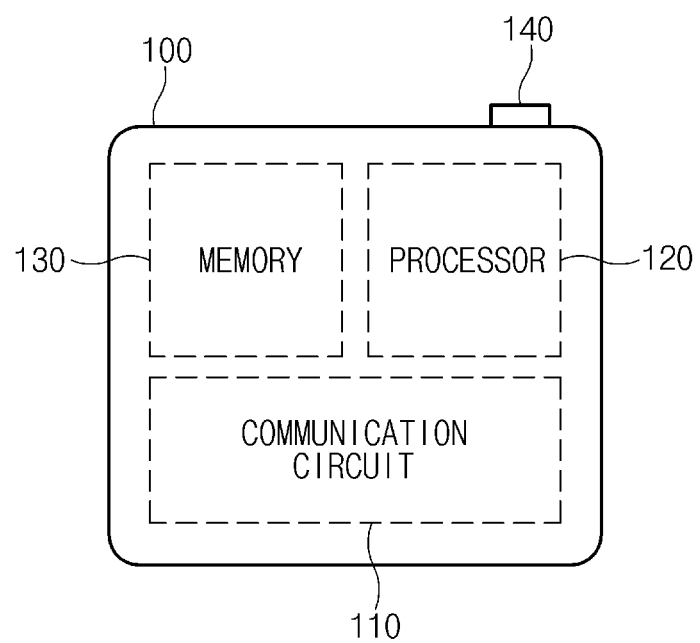
FIG. 1 is a view illustrating the configuration of a first electronic device, according to an embodiment.

FIG. 1 is a view illustrating the configuration of a first electronic device, according to an embodiment.

Referring to FIG. 1, a first electronic device 100 may be an electronic device making wireless communication through an IoT network. For example, the first electronic device 100 may be referred as bandwidth reduced low complexity user equipment (BLUE), narrowband internet-of-things (NB IoT) UE, cellular IoT UE, a mobile IoT device, or another term having the same technical meaning as those of the terms.

According to an embodiment, the first electronic device 100 may include a communication circuit 110, a processor 120, a memory 130, and a user interface 140. The components of the first electronic device 100 of FIG. 1 are provided only for the illustrative purpose, and the first electronic device 100 may further include other components not illustrated in FIG. 1. For example, the first electronic device 100 may further include an indicator exposed through a portion of a housing of the first electronic device 100. For another example, the first electronic device 100 may further include at least one of a motion sensor (not illustrated) or a location information obtaining unit. For another example, the processor 120 may be electrically and/or operatively connected with the memory 130, the communication circuit 110, the user interface 140, and another component illustrated in FIG. 1. Referring to FIG. 1, components (e.g., the memory 130, the processor 120, and the communication circuit 110), which are shown in dotted lines, may refer to components located inside the housing of the first electronic device 100.

According to an embodiment, the communication circuit 110 may provide an interface for making communication with different entities (e.g., base stations included in the network). The communication circuit 110 may convert a bit string transmitted to the different entity into a physical signal and may convert a physical signal received from the different entity into a bit string. In addition, the communication circuit 110 may transmit and receive a signal. Accordingly, the communication circuit 110 may be referred to as a "transmitter", "receiver" or "transceiver".

According to an embodiment, the first electronic device 100 (or the communication circuit 110) may support an LPWAN (e.g., NB-IoT network). For example, the communication circuit 110 may transceive data with the network through a pre-determined frequency band. The pre-determined frequency band may be used as a portion of a frequency band used in another cellular network (e.g., long term evolution (LTE), a universal mobile telecommunication system (UMTS), or a global system for mobile communications (GSM)) (hereinafter, referred to as "In-Band"), may include a guard band used in another cellular network, or may be used as a frequency band or a dedicated frequency band used in another cellular network (hereafter, referred to as "standalone"). For another example, to save costs and save battery power consumption, the communication circuit 110 may make communication with the network through a limited bandwidth. The limited bandwidth may be narrower than that used in another cellular network and may be, for example, 20 MHz, 1.4 MHz, or 180 KHz.

For example, the communication circuit 110 may access a network (e.g., a cellular network, or a LPWAN) based on various communication standards, such as category-machine (Cat-M), narrowband-IoT (NB-IoT) or extended coverage GSM for IoT (EC-GSM). For example, the LPWAN may include at least one of a NB-IoT network, a Cat-M network, or an EC-GSM network. For example, the Cat-M may be referred to as Cat-M or LTE-M. For example, the NB-IoT may be referred to as Cat-M2.

According to an embodiment, the communication circuit 110 may transceive data through a wireless local area network (WLAN) (e.g., WiFi). The communication circuit 110 may communicate with an external server through a WLAN.

According to an embodiment, the communication circuit 110 may communicate with an external electronic device through a short-range wireless network. For example, the short-range wireless network may be a network based on Bluetooth, Bluetooth Low Energy (BLE), or near field communication (NFC).

According to an embodiment, the communication circuit 110 may include a plurality of communication circuits. For example, the communication circuit 110 may include a first wireless communication circuit configured to provide first wireless communication using LPWAN, a second wireless communication circuit configured to provide second wireless communication using a WAN (e.g., Wi-Fi), and a third wireless communication circuit configured to provide third wireless communication using low-power Bluetooth. According to an embodiment, the re-booting of the communication circuit 110 may include the re-booting of at least some communication circuits of the communication circuit 110.

According to an embodiment, the processor 120 may include at least one processor. For example, the processor 120 may include at least one of an application processor or a cellular processor. According to an embodiment, the processor 120 may be run based on a program stored in the memory 130 of the first electronic device 100. For example, the memory 130 may store instructions causing the processor 120 to perform various operations. In the following description, the operation of the processor 120 may be performed in response to instructions stored in the memory 130. According to an embodiment, the processor 120 may be configured to control other components of the first electronic device 100. Unless otherwise specified in the following description, the operation of the first electronic device 100 may be referred to as the operation performed by the processor 120.

According to an embodiment, the user interface 140 may include at least one physical button exposed through a portion of the housing of the first electronic device 100. As described above, the first electronic device 100 may not include a display. Accordingly, the first electronic device 100 may receive a user input only through the user interface 140. Hereinafter, description will be made with reference to FIG. 2 regarding the configuration of an external electronic device that may communicate with the first electronic device 100 through a Bluetooth network or a BLE network.

Figure 2:
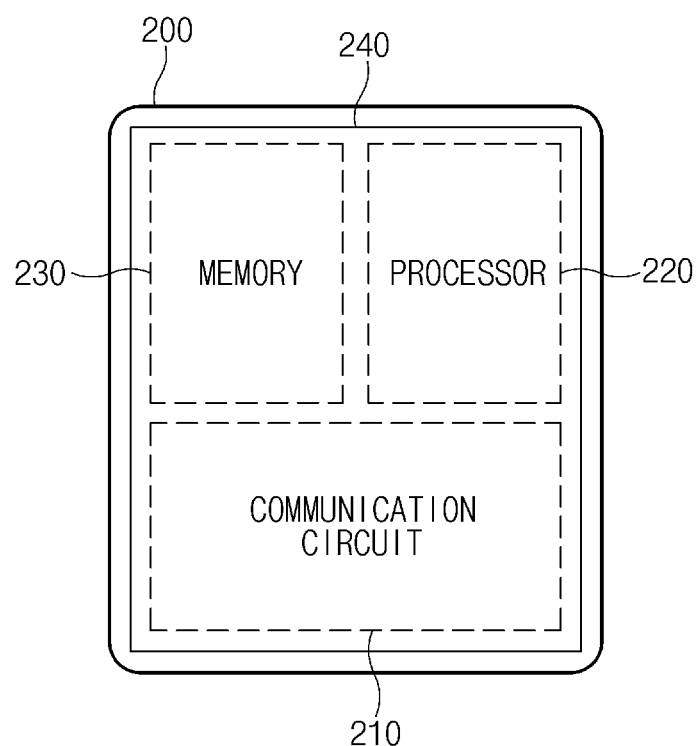
FIG. 2 is a view illustrating the configuration of a second electronic device, according to an embodiment.

FIG. 2 is a block diagram of a second electronic device, according to an embodiment.

Referring to FIG. 2, a second electronic device 200 may be the external electronic device making communication with the first electronic device 100 through a Bluetooth network or a BLE network. For example, the second electronic device 200 may be referred to as a terminal, user equipment (UE), a mobile station, a subscriber station, a remote terminal, a wireless terminal, a user device, or another term having the same technical meaning as those of the above components.

According to an embodiment, the second electronic device 200 may include a communication circuit 210, a processor 220, a memory 230, and a user display 240. The components of the second electronic device 200 of FIG. 2 are provided only for the illustrative purpose, and the second electronic device 200 may further include other components not illustrated in FIG. 2. For another example, the processor 220 may be electrically and/or operatively connected with the memory 230, the communication circuit 210, the user display 240, and another component not illustrated in FIG. 2.

According to an embodiment, the communication circuit 210 may provide an interface for making communication with different entities (e.g., base stations included in the network). The communication circuit 210 may convert a bit string to be transmitted to the different entity into a physical signal and may convert a physical signal received from the different entity into a bit string. In addition, the communication circuit 210 may transmit and receive a signal. Accordingly, the communication circuit 210 may be referred to as a "transmitter", "receiver" or "transceiver".

According to an embodiment, the second electronic device 200 (or the communication circuit 210) may support a cellular network. For example, the communication circuit 210 may transceive data with the network through a pre-determined frequency band. The pre-determined frequency band may be used as a portion of a frequency band used in another cellular network (e.g., long term evolution (LTE), a universal mobile telecommunication system (UMTS), or a global system for mobile communications (GSM)) (hereinafter, referred to as "In-Band"), may include a guard band used in another cellular network, or may be used as a frequency band or a dedicated frequency band used in another cellular network (hereafter, referred to as "stand-alone").

According to an embodiment, the communication circuit 210 may transceive data through a WLAN (e.g., WiFi). The communication circuit 210 may communicate with an external server through the WLAN.

According to an embodiment, the communication circuit 210 may communicate with the first electronic device 100 through a short-range wireless network. For example, the short-range wireless network may be a network based on Bluetooth, Bluetooth Low Energy (BLE), or near field communication (NFC).

According to an embodiment, the communication circuit 210 may include a plurality of communication circuits. For example, the communication circuit 210 may include a first wireless communication circuit configured to provide first wireless communication using LPWAN, a second wireless communication circuit configured to provide second wireless communication using a WAN (e.g., Wi-Fi), and a third wireless communication circuit configured to provide third wireless communication using low-power Bluetooth.

The description of the processor 220 and the memory 230 may be understood by making reference to the description of the processor 120 and the memory 130 of FIG. 1, respectively. For clarity, redundant details will not be repeated in the following description. As described above with reference to FIGS. 1 and 2, the first electronic device 100 and the second electronic device 200 may communicate with each other through various networks. Hereinafter, the connection between the first electronic device 100 and the second electronic device 200 under a network environment will be described with reference to FIG. 3, according to various embodiments.

Figure 3:
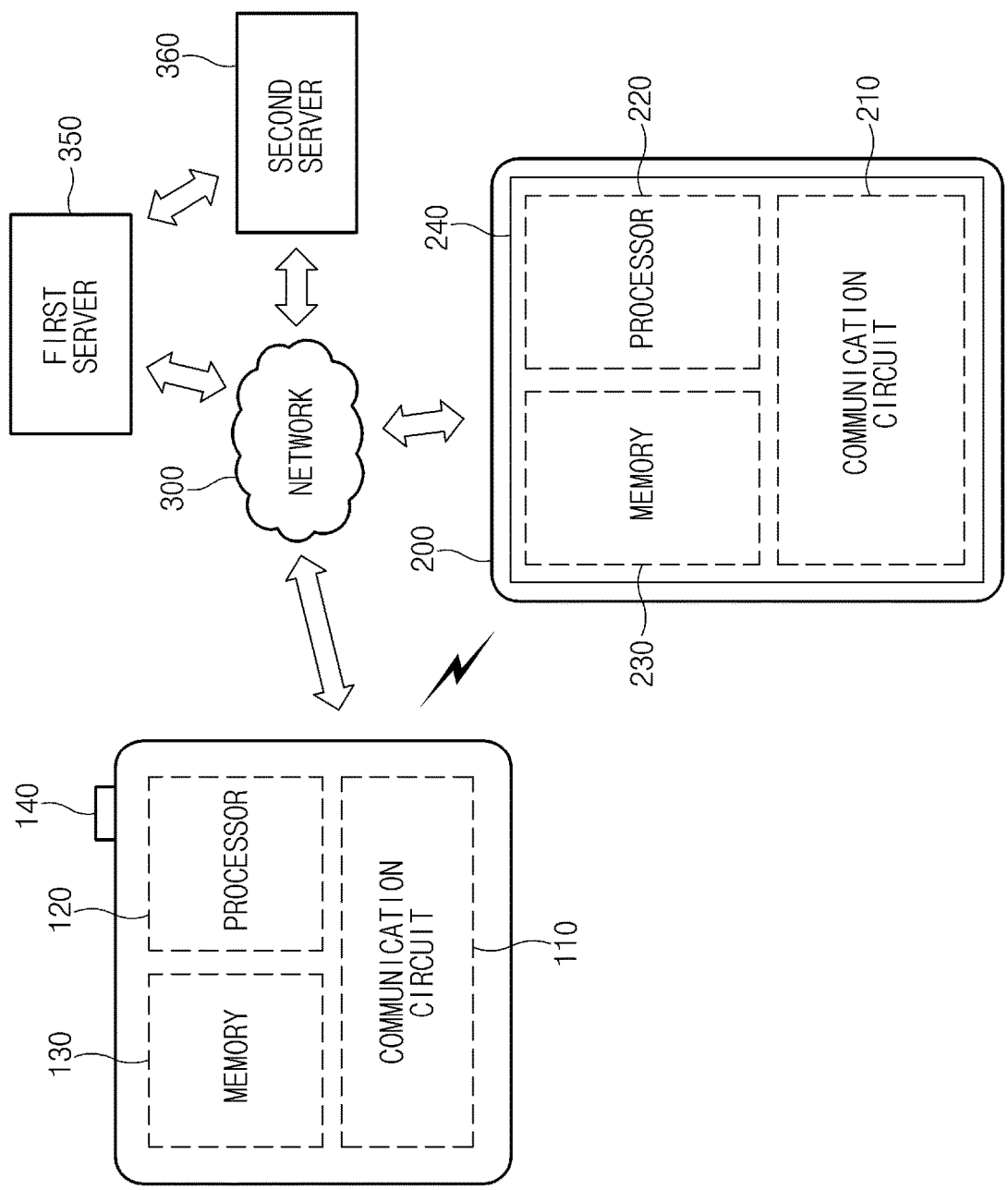
FIG. 3 is a view illustrating a network environment supporting IoT, according to various embodiments.

FIG. 3 is a view illustrating a network environment supporting an IoT, according to various embodiments. Each component may be one entity and a set of multiple entities.

Referring to FIG. 3, the first electronic device 100 and the second electronic device 200 may communicate with a first server 350 and/or a second server 360 through a network 300. According to an embodiment, the network 300 may include one or more entities making communication with the first electronic device 100 and the second electronic device 200 through a wired/wireless channel. For example, the network 300 may include at least one of a base station (e.g., an access point (AP), an eNodeB (eNB), a 5G node ($5^{th}$ generation node), a wireless point, a transmission/reception point (TRP), a SGNB ($5^{th}$ generation NodeB) or another term having the same technical meaning as those of the above components), a mobility management entity (MME), a gateway (GW), a home subscriber server (HSS), and a service capability exposure function (SCEF). According to an embodiment, the network 300 may correspond to a cellular network (e.g., LPWAN).

According to an embodiment, the first electronic device 100 and the second electronic device 200 may communicate with the first server 350 and/or the second server 360 through a WLAN (e.g., a WiFi network).

According to an embodiment, the first electronic device 100 and the second electronic device 200 may communicate with each other through a network 310. According to an embodiment, the network 310 may correspond to a short-range wireless network (e.g., Bluetooth, Bluetooth Low Energy (BLE), or a network based on near field communication (NFC)). For example, the network 310 may be referred to as a network (e.g., a communication link) that is constructed between the first electronic device 100 and the second electronic device 200 without the invention of another network entity. According to an embodiment, the first server 350 may be a relay server between the second electronic device 200 and the second server 360. According to an embodiment, the first server 350 may receive, from the second electronic device 200, information (e.g., information used for identifying the first electronic device 100) associated with the first electronic device 100 and may transmit the received information to the second server 360. For example, the first server 350 may transmit, to the second server 360, a request (e.g., a sign-in request, a sign-out request, or a state information request), which is associated with the first electronic device 100, received from the second electronic device 200. According to an embodiment, the first server 350 may transmit, to the second electronic device 200, a response to the request, which is associated with the first electronic device 100, received from the second server 360.

According to an embodiment, the first server 350 may determine a service provider, based on the identification information of the first electronic device 100. For example, the first server 350 may determine the second server 360 as a server corresponding to the determined service provider. The management of an IoT device (e.g., the first electronic device 100) for various service providers may be efficiently performed, by using the request associated with the first electronic device 100 through the first server 350.

According to an embodiment, the first server 350 may be configured to process the request associated with the IoT device (e.g., the first electronic device 100). According to an embodiment, the first server 350 may include a database having information (at least one of identification information or state information) associated with the IoT device. For example, the first server 350 may be a work with smart things cloud server (e.g., Samsung IoT cloud server). According to an embodiment, the first server 350 may be connected with the second server 360 while maintaining security. According to an embodiment, the first electronic device 100 and the second electronic device 200 may communicate with each other through the first server 350. According to an embodiment, the first server 350 may include a database including account information associated with the second electronic device 200. According to an embodiment, an account associated with the second electronic device 200 may be associated with a plurality of electronic devices. For example, the account associated with the second electronic device 200 may be associated with the first electronic device 100. For example, the account may be associated with a user and a plurality of electronic devices (e.g., the first electronic device 100 and the second electronic device 200) may be registered in the account associated with the user. For example, the first server 350 may manage one or more electronic devices through one account.

According to an embodiment, the second server 360 may correspond to a service provider server of a cellular network (e.g., the network 300). For example, the second server 360 may be configured to manage sign-in information, registration information, or status information of an electronic device (e.g., the first electronic device 100 and the second electronic device 200). For example, the second server 360 may receive, from the first server 350, a request (e.g., a sign-in request, a sign-out request, or a state information request), which is associated with the first electronic device 100. For example, the second server 360 may transmit, to the first server 350, a response to the request associated with the first electronic device 100.

According to an embodiment, the first electronic device 100 may include only a simple physical button (e.g., the user interface 140) without including a display. For example, the first electronic device 100 may obtain information (hereinafter, referred to as "network state information") on a network state only by using the simple physical button.

Figure 4:
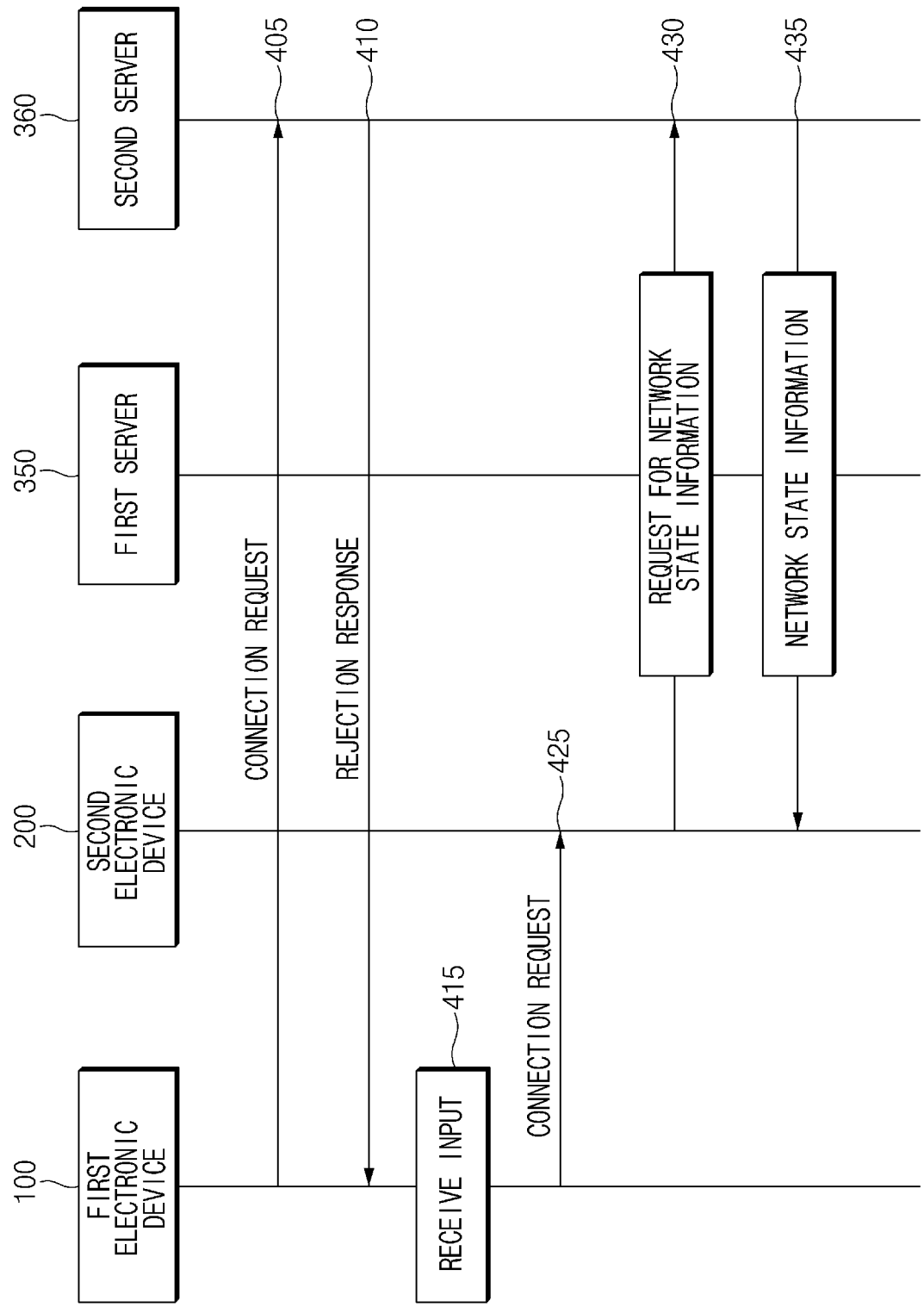
FIG. 4 is a flowchart illustrating a method of obtaining network state information, according to an embodiment.

FIG. 4 is a flowchart illustrating a method of obtaining the network state information, according to an embodiment. According to an embodiment of FIG. 4, it is assumed that the first electronic device 100 is not registered (unregistered state) in an LPWAN (e.g., the network 300) at the initial stage. According to an embodiment of FIG. 4, it is assumed that the first electronic device 100 is connected with the second electronic device 200 through a short-range wireless network (e.g., the network 310). For example, operations illustrated in FIG. 4 may be performed in a procedure of registering the first electronic device 100 in the second electronic device 200.

In operation 405, the first electronic device 100 (e.g., the processor 120) may transmit a connection request to a service provider server (e.g., the second server 360) of the LPWAN through the LPWAN (e.g., the network 300) using a communication circuit 110. For example, the connection request may be an attach request. According to an embodiment, the first electronic device 100 may perform the attach request by transmitting a request to a base station provided by a service provider of the LPWAN by using communication information (e.g., an international mobile subscriber identity (IMSI) recorded in an embedded subscriber identity module (eSIM)) stored in the first electronic device 100. For example, the base station may obtain information on an activation state (e.g., subscription state) associated with communication information from the service provider server (e.g., the second server 360) by using the communication information included in the attach request. The service provider server may transmit a reject response to the first electronic device 100 through the base station when the activation information associated with communication information is not present (e.g., inactive or unregistered state). According to an embodiment, the first electronic device 100 may transmit a connection request to the second server 360 when the first electronic device 100 may be turned on or may have data to be transmitted. According to an embodiment, the first electronic device 100 may periodically transmit the connection request to the second server 360. According to an embodiment, when receiving the reject response, the first electronic device 100 may provide, through an indicator (e.g., the LED unit), a notification of indicating that the first electronic device 100 is unregistered in the LPWAN.

In operation 410, since the first electronic device 100 is unregistered in the LPWAN, the first electronic device 100 may receive the rejection response from the second server 360 through the LPWAN (e.g., the network 300) by using the communication circuit 110. For example, the rejection response may be an attach reject. According to an embodiment, the rejection response may include information on a cause of the rejection. The cause of the rejection may directly or indirectly indicate that the first electronic device 100 is not registered in the LPWAN.

After the rejection response is received, the first electronic device 100 may stay in a standby state. For example, since the first electronic device 100 does not include a display to display the detailed information, the state information of the first electronic device 100 may be provided for a user through the second electronic device 200. According to an embodiment, the first electronic device 100 and the second electronic device 200 may communicate with each other through a short-range wireless network (e.g., the network 310). According to an embodiment, the first electronic device 100 and the second electronic device 200 may be connected with each other based on a short-range wireless network technology (e.g., a Bluetooth, BLE, or NFC).

In operation 415, the first electronic device 100 may receive a user input. Accordingly, the first electronic device 100 may receive the user input only through the user interface 140. According to an embodiment, the user input may be applied to perform a procedure of pairing between the first electronic device 100 and the second electronic device 200. For example, the second electronic device 200 may transmit, to the first electronic device 100, a message for pairing. According to an embodiment, the first electronic device 100 may provide a notification through an indicator to correspond to the reception of the message for pairing. According to an embodiment, after providing the notification, the first electronic device 100 may receive the user input through the user interface 140.

In operation 425, when the user input is received, the first electronic device 100 may transmit, to the second electronic device 200, registration information (e.g., information including at least one of international mobile equipment identity (IMEI), an integrated circuit card identifier (ICCID), an international mobile scriber identity (IMSI), or a serial number) including identification information of the first electronic device 100 through a short-range wireless network (e.g., the network 310). According to an embodiment, the first electronic device 100 may transmit, to the second electronic device 200, the registration information in the form of a plain text. According to an embodiment, the first electronic device 100 may have identification information of the first electronic device 100 set in the manufacturing process of the first electronic device 100. According to an embodiment, the first electronic device 100 may receive, from the first server 350, registration information created based on the identification information of the first electronic device 100. For example, the first server 350 may receive the identification information from the first electronic device 100 and may create the registration information based on the identification information. According to an embodiment, the registration information may be encrypted by the first server 350. For example, the second electronic device 200 may not decrypt the encrypted registration information. For example, the first server 350 may decrypt the encrypted registration information.

In operation 430, the second electronic device 200 (e.g., the processor 220) may transmit a request for the network state information to the second server 360 through the first server 350. For example, the second electronic device 200 may transmit, to the first server 350, the request for the network state information through a cellular network (e.g., the network 300) or a WLAN by using the communication circuit 210. According to an embodiment, the first server 350 may transmit the request for the network state information to the second server 360. For example, the first server 350 may transmit the request for the network state information to the second server 360 while maintaining security.

According to an embodiment, the request for the network state information may include the registration information of the first electronic device 100. For example, when the registration information including the encrypted identifier is received from the first electronic device 100, the second electronic device 200 may transmit the request for the network state information including the encrypted identifier to the first server 350. For example, the first server 350 may decrypt the encrypted identifier. According to an embodiment, the first server 350 may determine a service provider associated with the first electronic device 100 based on the registration information of the first electronic device 100. For example, the first server 350 may determine the service provider based on a country code (e.g., mobile country code) and a network code (e.g., a mobile network code) included in the registration information of the first electronic device 100.

According to an embodiment, the first server 350 may transmit the request for the network state information to the second server 360, based on the determined service provider. According to an embodiment, the request for the network state information may include the registration information of the first electronic device 100.

For example, when the encrypted identifier of the first electronic device 100 is received from the second electronic device 200, the first server 350 may decrypt the encrypted identifier and may transmit registration information including the decrypted identifier to the second server 360 through the network state information.

In operation 435, the second server 360 may transmit the network state information to the second electronic device 200 through the first server 350. For example, the second server 360 may transmit, to the first server 350, the network state information of the first electronic device 100. For example, the second server 360 may transmit the network state information to the first server 350 while maintaining security. For example, the first server 350 may transmit, to the second electronic device 200, the received network state information through a cellular network (e.g., the network 300) or a WLAN.

According to an embodiment, the network state information may include information associated with the sign-in state of the first electronic device 100 to the network. For example, the network state information include information indicating that the first electronic device 100 is unregistered, inactive, active, or in pending. According to an embodiment, when the network state information of the first electronic device 100 indicates that the first electronic device 100 is unregistered or inactive, the network state information may include at least one of a uniform resource locator (URL) or an application identifier for the registration/activation of the first electronic device 100 in the LPWAN.

According to an embodiment, when receiving the network state information, the second electronic device 200 may transmit at least a portion of the network state information to the first electronic device 100 through a short-range communication network (e.g., the network 310).

According to an embodiment, when receiving the network state information, the second electronic device 200 may display a user interface on the display 240 based on the network state information.

The first electronic device 100 has to be signed in to a network service provider to transmit/receive data through the cellular network (e.g., the network 300). According to an embodiment, the first electronic device 100 may include only a simple physical button (e.g., the user interface 140) without including a display. For example, when the network state information indicates that the first electronic device 100 is unregistered or inactive in the LPWAN, the second electronic device 200 may receive information on the registration/activation of the first electronic device 100 through the user interface. Hereinafter, a method of activating (e.g., registering) the first electronic device 100 will be described with reference to FIG. 5.

Figure 5:
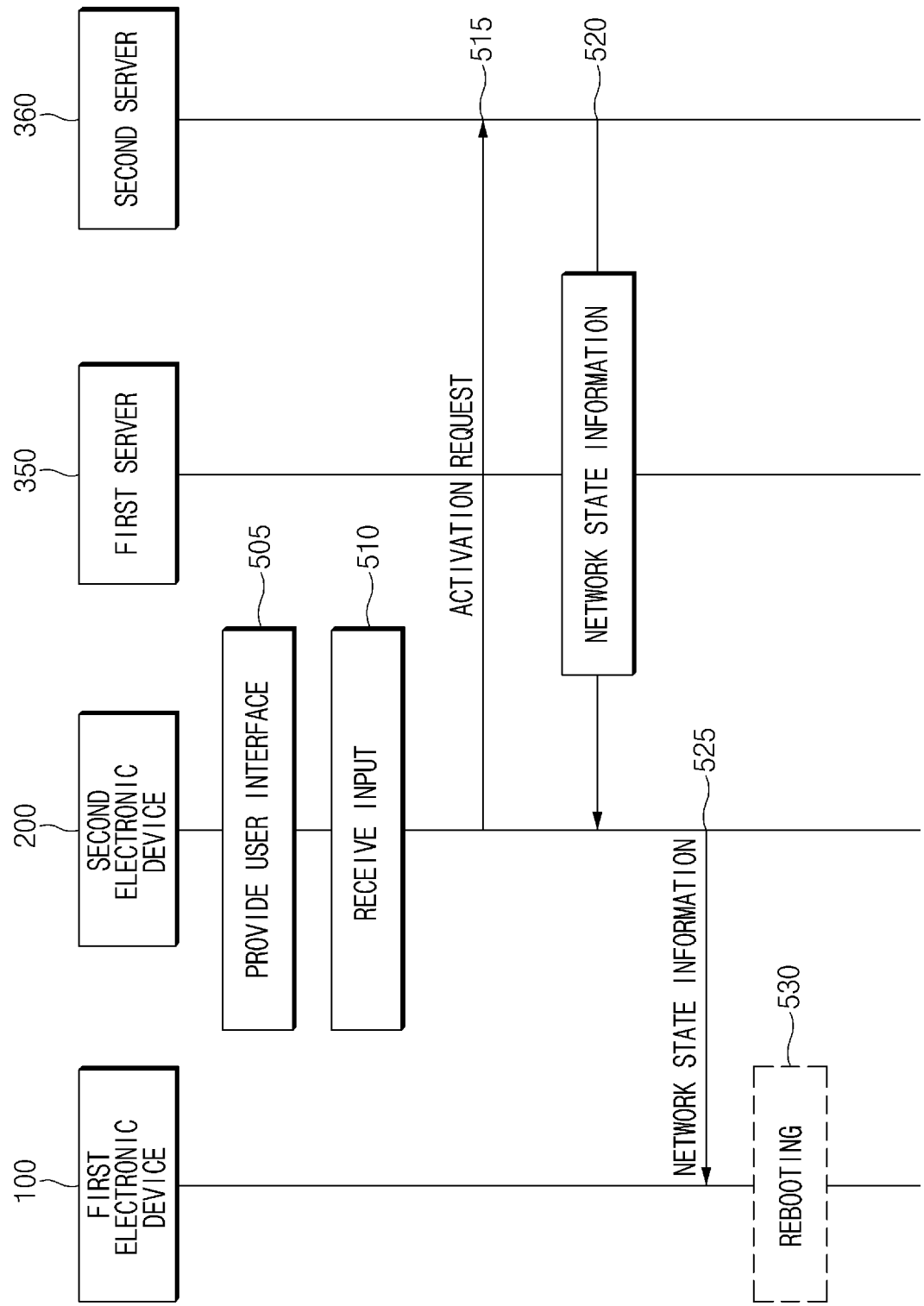
FIG. 5 is a flowchart illustrating sign-in method to a network, according to an embodiment.

FIG. 5 is a flowchart illustrating a sign-in method to a network (hereinafter, referred to as "network sign-in method"), according to an embodiment.

As described above with reference to FIG. 4, the first electronic device 100 and the second electronic device 200 may communicate with each other through a short-range wireless network (e.g., the network 310). For example, the first electronic device 100 may be paired with the second electronic device 200. According to an embodiment, the network sign-in method to be described below may be performed in a procedure (e.g., Samsung Easy Setup, Samsung Connect or Application for registration) of registering the first electronic device 100 in the second electronic device 200. For example, the second electronic device 200 (e.g., the processor 220) may search for the first electronic device 100 based on a short-range wireless network technology (e.g., Bluetooth, BLE, or NFC). For example, the second electronic device 200 may display an external electronic device (e.g., the first electronic device 100), which is searched, on a user interface of the display 240. For example, the second electronic device 200 may receive a user input for the first electronic device 100 and may be paired with the first electronic device 100 based on the short-range wireless network technology. For example, the second electronic device 200 may transmit a pairing request message to the first electronic device 100 through the short-range wireless network using the communication circuit 210. When the pairing request message is received, the first electronic device 100 (e.g., the processor 120) may provide, through an indicator, a notification corresponding to the reception of a pairing request message or a user input request. For example, when the user input is received through the user interface 140 after the notification is provided, the first electronic device 100 may transmit, to the second electronic device 200, registration information (e.g., information including at least one of IMEI, an ICCID, an IMSI, or a serial number) including identification information of the first electronic device 100 through the short-range wireless network by using the communication circuit 110.

According to an embodiment, the second electronic device 200 may request for network state information of the first electronic device 100 (e.g., operation 430 of FIG. 4) by using the registration information of the first electronic device 100 and receive the network state information (e.g., operation 435 of FIG. 4).

According to an embodiment, the second electronic device 200 may register the first electronic device 100 in a database of the first server 350 by using the registration information of the first electronic device 100. For example, the second electronic device 200 may register the first electronic device 100 in an account associated with the second electronic device 200, which is included in the first server 350. According to an embodiment, the second electronic device 200 may obtain, from the first server 350, information for the access to the first server 350 by the first electronic device 100. According to an embodiment, the second electronic device 200 may obtain an authentication code of the first electronic device 100 from the account associated with the second electronic device 200 and may request the first server 350 to provide an access token to the first electronic device 100 by using the obtained authentication code. According to an embodiment, the second electronic device 200 may receive the access token provided from the first server 350 and may transmit the access token to the first electronic device 100.

According to an embodiment, the network state information may represent the state that the first electronic device 100 is unregistered or inactive. For example, the second electronic device 200 may provide, for a user, a user interface for the registration or the activation of the first electronic device 100.

Referring to FIG. 5, in operation 505, the second electronic device 200 (e.g., the processor 220) may provide a user interface for activation (e.g., registration) of the first electronic device 100 on the display 240. According to an embodiment, the user interface may be provided based on the network state information. For example, the network state information may represent the state that the first electronic device 100 is unregistered or inactive. According to an embodiment, the network state information may include an URL or an application identifier for the registration or the activation of the first electronic device 100. For example, the second electronic device 200 may display, on the display 240, a web-page, which corresponds to the URL included in the network state information, serving as a user interface through the web-browser. For example, the second electronic device 200 may display, on the display 240, the user interface by executing an application (e.g., Samsung Connect or a specified Application) corresponding to the application identifier included in the network state information. According to an embodiment, when the network state information indicates the state that the first electronic device 100 is unregistered or inactive, the second electronic device 200 may provide a user interface on the display 240 by using a specified application (e.g., Samsung Connect or Application for registration) or a specified web-page.

In operation 510, the second electronic device 200 may receive a user input to the user interface. For example, the second electronic device 200 may obtain a selection of information for user authentication (e.g., information for identifying the user) or information on a payment system of the first electronic device 100 through the user input.

In operation 515, when the user input is received, the second electronic device 200 may transmit a request for activation to the second server 360 through a cellular network (e.g., the network 300) or WLAN (e.g., WiFi) by using the communication circuit 210. According to an embodiment, the request for the activation may include at least one of registration information of the first electronic device 100, information for user authentication, or information on a payment system of the first electronic device 100. For example, the second server 360 may be a service provider server of a service provider different for a service provider in which the second electronic device 200 is signed in.

In operation 520, the second electronic device 200 may receive the network state information from the second server 360 through the first server 350. For example, the second server 360 may process the activation of the first electronic device 100 based on the received activation request and may transmit, to the first server 350, network state information including the activation result. For example, the second server 360 may transmit the network state information to the first server 350 while maintaining security. For example, the first server 350 may transmit the received network state information to the second electronic device 200 through the cellular network (e.g., a network 300) or a WLAN (e.g., Wi-Fi). For example, the network state information may represent that the first electronic device 100 is registered, active, or in pending.

According to an embodiment, the second electronic device 200 may display the received network state information on the display 240.

In operation 525, the second electronic device 200 may transmit the network state information to the first electronic device 100 through a short-range wireless network using the communication circuit 210. According to an embodiment, the second electronic device 200 may transmit, to the first electronic device 100, a message indicating that a network is available.

In operation 530, when receiving, from the second electronic device 200, the message (e.g., the network state information) indicating that the network is available, the first electronic device 100 (e.g., the processor 120) may reboot at least a portion of the first electronic device 100. For example, the first electronic device 100 may reboot the communication circuit 110. According to an embodiment, the second electronic device 200 may transmit, to the first electronic device 100, information directing the rebooting of the first electronic device 100. According to an embodiment, the second electronic device 200 may display, on the display 240, information guiding the rebooting of the first electronic device 100. For example, after rebooting, the first electronic device 100 may transmit a request for access to an LPWAN (e.g., the network 300). According to an embodiment, the rebooting of the first electronic device 100 may be omitted. According to an embodiment, the rebooting of the communication circuit 110 may include the re-booting of at least a portion of the communication circuit 110.

According to an embodiment, the first electronic device 100 may access to the first server 350 through the LPWAN (e.g., the network 300). For example, the first electronic device 100 may access the first server 350 by using the access token of the first electronic device 100, which is received from the second electronic device 200. For example, the access token of the first electronic device 100 may be obtained from the second electronic device 200 in the procedure of registering the first electronic device 100 to the second electronic device 200. According to an embodiment, the first electronic device 100 may access the account associated with the second electronic device 200, which is included in the first server 350 by using the access token. For example, the first electronic device 100 may sign in or log in the account associated with the second electronic device 200. According to an embodiment, the information on the access to the first server 350 by the first electronic device 100 may be provided through the second electronic device 200.

As described above with reference to FIG. 5, the sign-in/registration of the first electronic device 100 may be performed through the second electronic device 200 and the first server 350. For example, the activation information for signing in the first electronic device 100 may be received from a user by using the second electronic device 200. For example, various requirements of various service providers (e.g., the second server 360) may be integrally processed by the first server 350. According to an embodiment, the procedure of signing out the first electronic device 100 may be performed through a similar mechanism.

Figure 6:
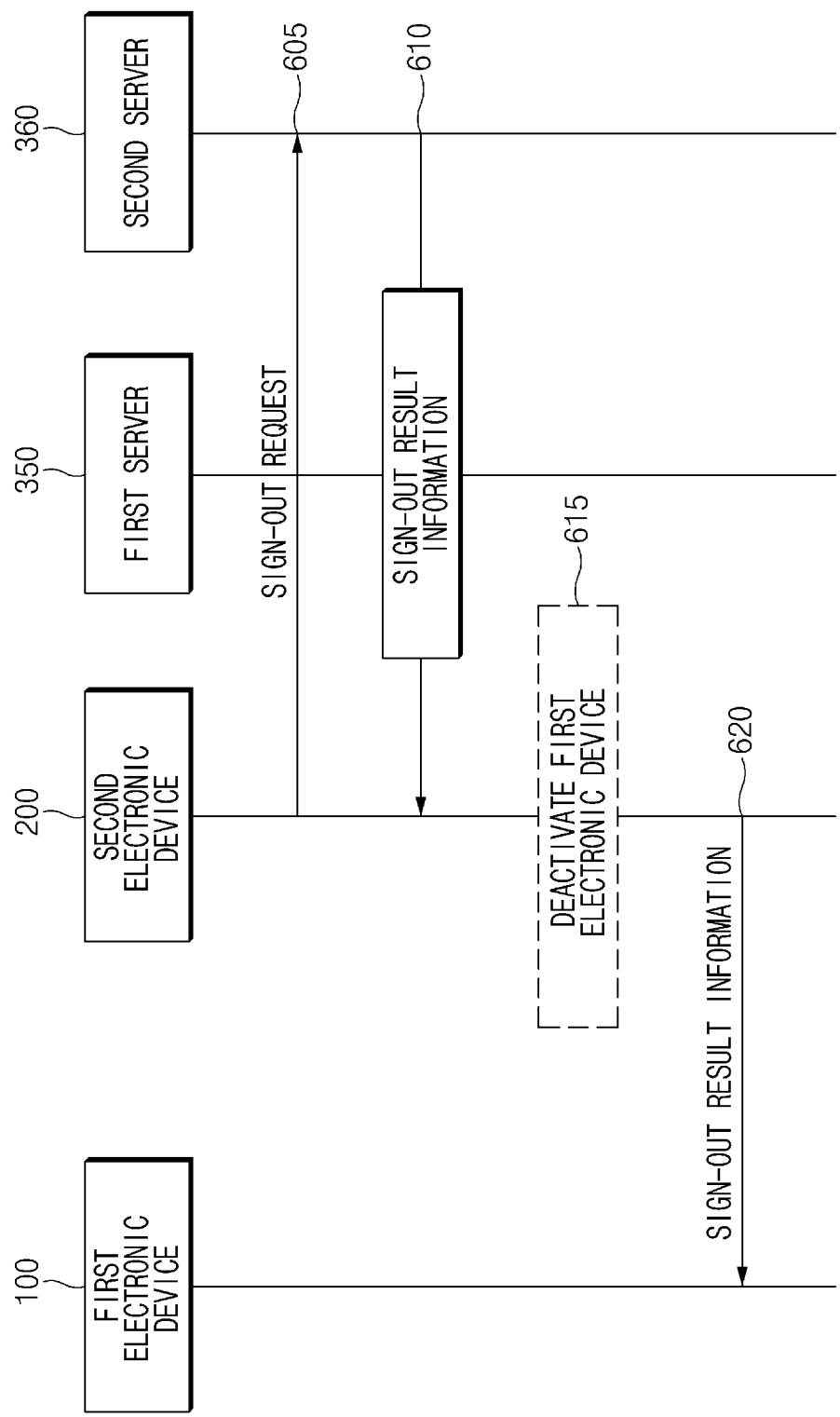
FIG. 6 is a flowchart illustrating a sign-out method, according to an embodiment.

FIG. 6 is a flowchart illustrating a sign-out method, according to an embodiment.

In operation 605, the second electronic device 200 (e.g., the processor 220) may transmit, to the second server 360, a request for sign-out of the first electronic device 100 through a cellular network (e.g., the network 300) or the WLAN (e.g., Wi-Fi) by using the communication circuit 210. According to an embodiment, the second electronic device 200 may display a user interface for receiving the request for sign-out on the display 240. For example, the user interface for receiving the request for sign-out may be provided through a specified application (e.g., Samsung Connect or Application for registration) or a web-page.

In operation 610, the second electronic device 200 may receive sign-out result information from the second server 360 through the first server 350. For example, the second server 360 may process the sign-out of the first electronic device 100 based on the received sign-out request and may transmit, to the first server 350, the sign-out result information. For example, the second server 360 may transmit information on a sign-out result state to the first server 350 while maintaining security. For example, the first server 350 may transmit the received the sign-out result information to the second electronic device 200 through the cellular network (e.g., the network 300) or a WLAN (e.g., Wi-Fi). According to an embodiment, the first server 350 may delete at least a portion of data, which is associated with the first electronic device 100, from the account associated with the second electronic device 200. For example, when the first server 350 receives the sign-out result information from the second server 360, the first server 350 may delete the at least a portion of data associated with the first electronic device 100.

In operation 615, when the sign-out result information is received, the second electronic device 200 may deactivate the first electronic device 100 by deleting the first electronic device 100 from the second electronic device 200. For example, the deactivation of the first electronic device 100 may include the deactivation (e.g., the release from registration, or deletion) of the first electronic device 100 on a specified application (e.g., Samsung Connect) or the deletion of plug-in corresponding to the first electronic device 100 on the specified application (e.g., Samsung Connect). For example, the deactivation of the first electronic device 100 may include the deletion of an application associated with the sign-in or the sign-out of the first electronic device 100. According to an embodiment, the second electronic device 200 may display the sign-out result information on the display 240. According to an embodiment, operation 615 may be omitted. According to an embodiment, the first server 350 may delete the at least a portion of data associated with the first electronic device 100 from the account associated with the second electronic device 200. For example, the second electronic device 200 may transmit, to the first server 350, information on the deactivation of the first electronic device 100 in addition to the deactivation of the first electronic device 100. For example, when the first server 350 receives information on the deactivation of the first electronic device 100 from the second electronic device 200, the first server 350 may delete the at least a portion of data associated with the first electronic device 100.

In operation 620, the second electronic device 200 may transmit the sign-out result information to the first electronic device 100 through the short-range wireless network (e.g., Bluetooth, BLE, or NFC) using the communication circuit. For example, when the sign-out result information is received, the connection to the LPWAN of the first electronic device 100 may be restricted. According to an embodiment, when the sign-out result information is received, the first electronic device 100 may provide, through an indicator, a notification corresponding to the reception of the sign-out result information. According to an embodiment, the first electronic device 100 may be initialized. For example, the first electronic device 100 may be initialized when receiving the sign-out result information from the second electronic device 200. For example, the first electronic device 100 may perform an initialization of the first electronic device 100 based on receiving a direction corresponding to the initialization from the second electronic device 200 or based on a preset input to the interface 140.

Figure 7:
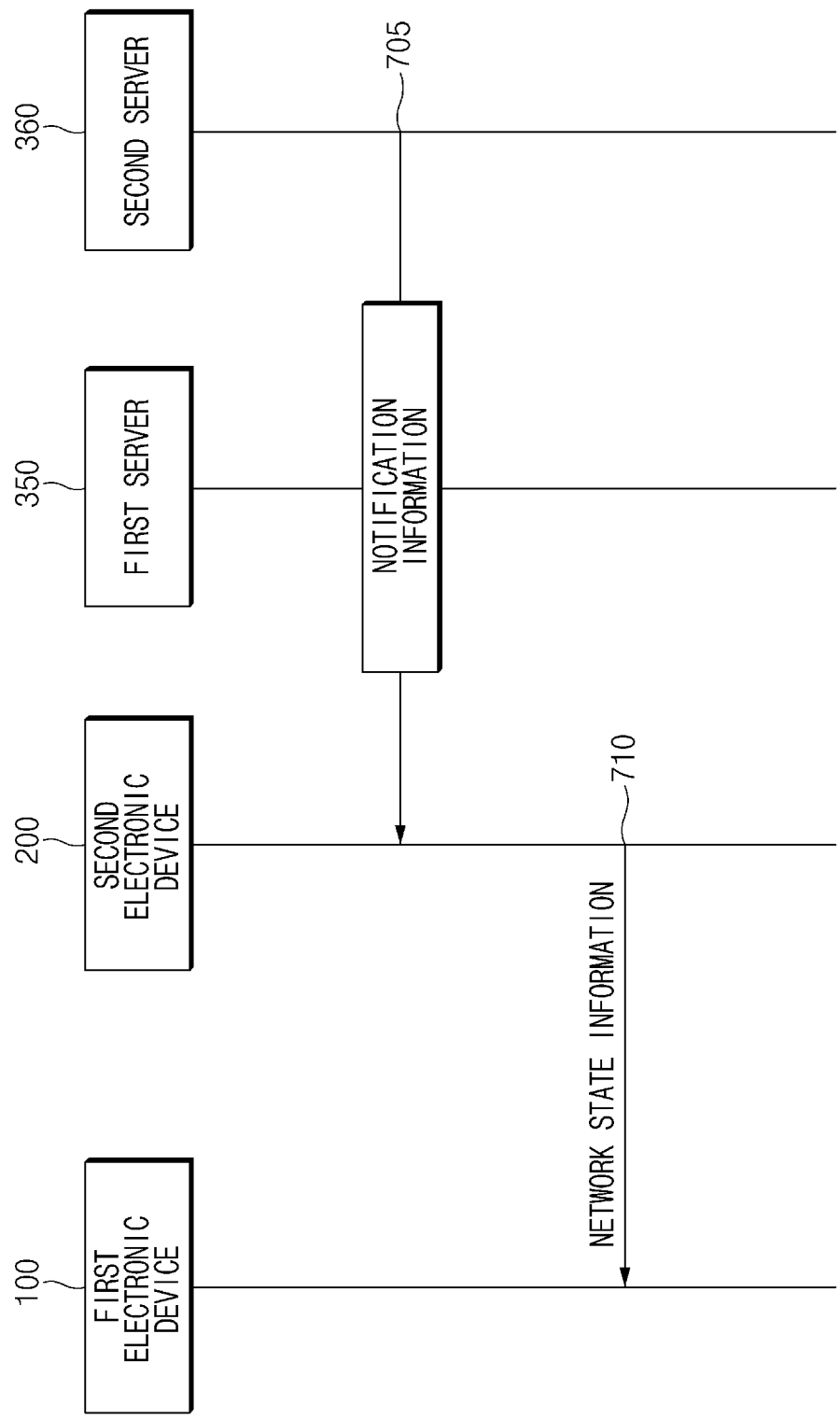
FIG. 7 is a flowchart illustrating a method for receiving notification information, according to an embodiment.

FIG. 7 is a flowchart illustrating a method for receiving notification information, according to an embodiment.

In operation 705, the second electronic device 200 may receive notification information from the second server 360 through the first server 350. For example, the second server 360 may transmit the notification information to the first server 350. For example, the second server 360 may transmit the notification information to the first server 350 while maintaining security. For example, the first server 350 may transmit the received notification information to the second electronic device 200 through the cellular network (e.g., the network 300) or the WLAN (e.g., Wi-Fi).

According to an embodiment, the notification information may include warning information (e.g., warning about the usage of data) or information (e.g., tariiff expiration) on the deactivation of the first electronic device According to an embodiment, the second electronic device 200 may display the received notification information on the display 240. For example, the notification for the first electronic device 100 may be provided for a user through the second electronic device 200.

In operation 710, the second electronic device 200 may transmit the network state information to the first electronic device 100 through the short-range wireless network (e.g., the network 310) using the communication circuit 210. According to an embodiment, the network state information may include information the sign-out or the cancelling of the activation of the first electronic device 100.

Figure 8:
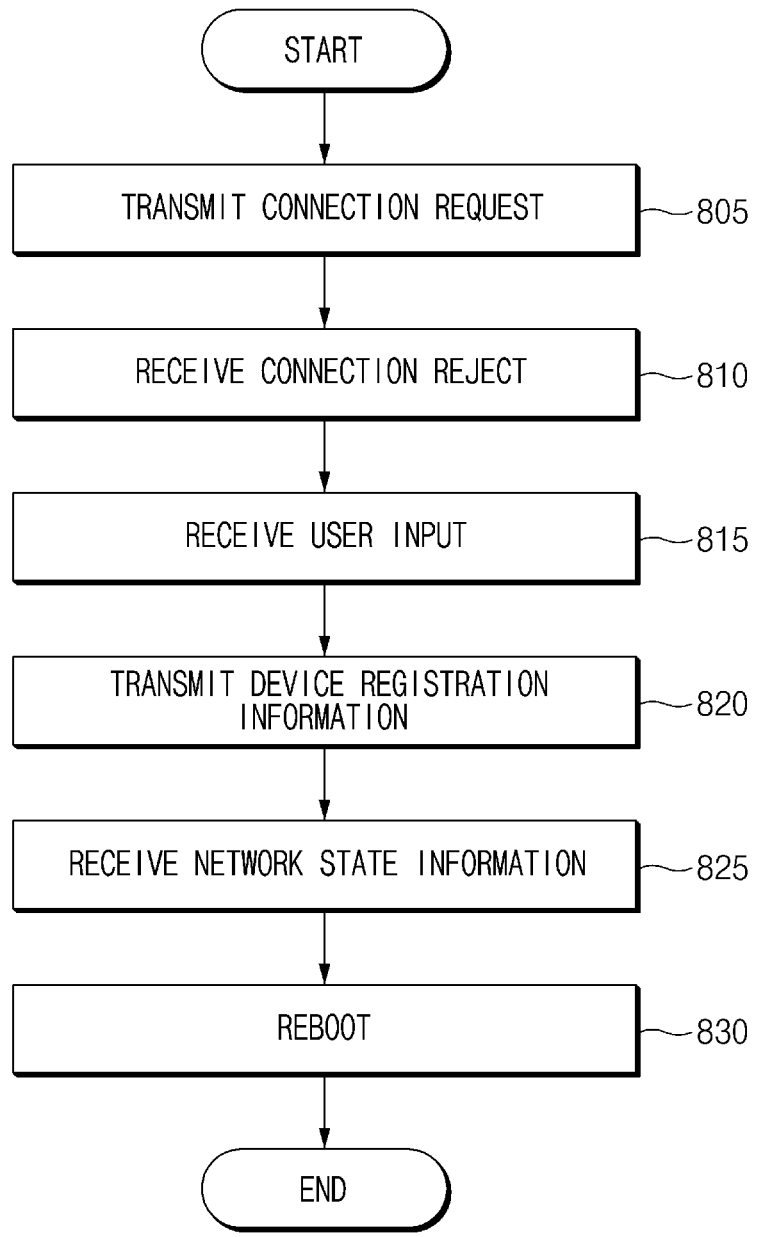
FIG. 8 is a flowchart illustrating a method for signing in a first electronic device to a network, according to an embodiment.

FIG. 8 is a flowchart illustrating a method for signing in the first electronic device 100 to a network, according to an embodiment.

In operation 805, the first electronic device 100 (e.g., the processor 120) may transmit, to an LPWAN, a request for connection to the LPWAN through the LPWAN (e.g., the network 300). For example, the request for the connection to the LPWAN may correspond to an attach request. The description of operation 805 may be understood by making reference to the description of operation 405 made with reference to FIG. 4.

In operation 810, the first electronic device 100 may receive a response indicating a rejection of the request from the LPWAN. For example, the LPWAN may include at least one of a NB-IoT network, a Cat-M network, or an EC-GSM network. For example, the response may correspond to an attach reject. The description of operation 810 may be understood by making reference to the description of operation 410 made with reference to FIG. 4.

In operation 815, the first electronic device 100 may receive a user input through the user interface 140. For example, the user interface 140 may include a button (e.g., a physical button) and may not include a display. The description of operation 815 may be understood by making reference to the description of operation 415 made with reference to FIG. 4.

In operation 820, when the user input is received, the first electronic device 100 may provide, to an external electronic device (e.g., the second electronic device 200), device registration information through the BLE. For example, the device registration information may include at least one of IMEI, an ICCID, IMSI, or a serial number. For example, the device registration information may be obtained from an eSIM of the first electronic device 100. The description of operation 820 may be understood by making reference to the description of operation 425 made with reference to FIG. 4.

In operation 825, the first electronic device 100 may receive the network state information from the external electronic device (e.g., the second electronic device 200). For example, the network state information may include information representing at least one of an unregistered state, an inactive state, an active state, a pending state, an URL, or an application identifier. The description of operation 825 may be understood by making reference to the descriptions of operation 430 and operation 435 made with reference to FIG. 4.

In operation 830, the first electronic device 100 may reboot. For example, the first electronic device 100 may reboot when the network state information is received. According to an embodiment, the rebooting of the first electronic device 100 may include the re-booting of at least a portion of the communication circuit 110. For example, when the first electronic device 100 is rebooted, only the RF circuit of the communication circuit 110 may be rebooted.

Figure 9:
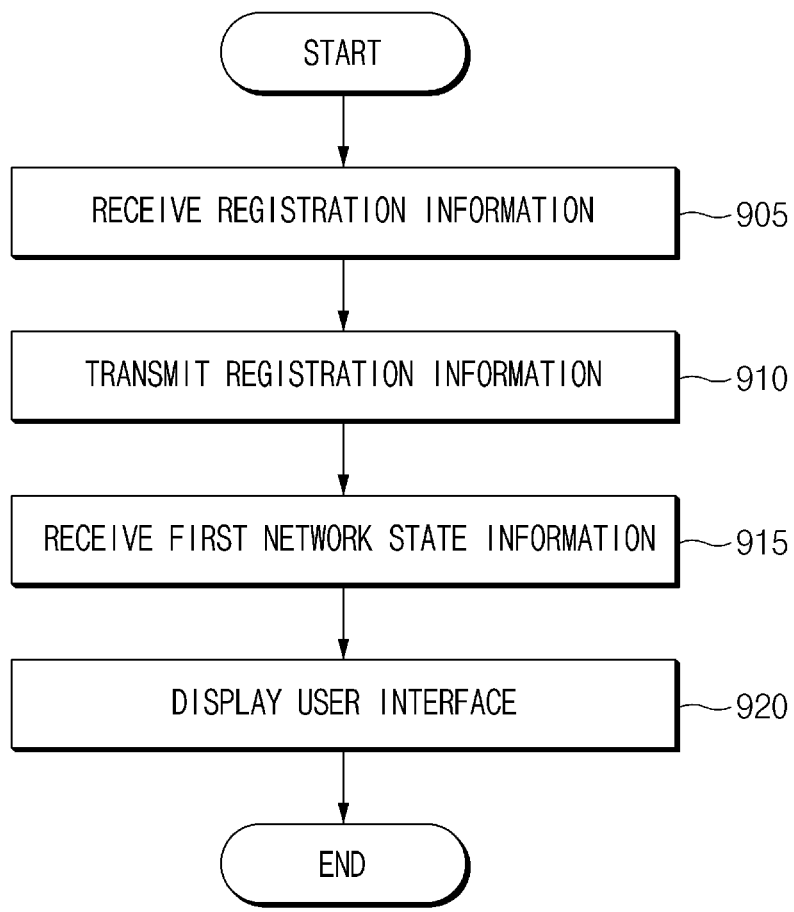
FIG. 9 is a flowchart illustrating a method of obtaining network state information of a second electronic device, according to an embodiment.

FIG. 9 is a flowchart illustrating a method of obtaining network state information of the second electronic device 200, according to an embodiment.

In operation 905, the second electronic device 200 (e.g., the processor 220) may receive, from a first external electronic device (e.g., the first electronic device 100), registration information including an identifier (e.g., IMEI, ICCID, IMSI, or a serial number) of the first external electronic device through a short-range wireless network (e.g., the network 300) using the communication circuit 210. According to an embodiment, the registration information may include an encrypted identifier. For example, the first external electronic device may be an LPWAN (e.g., a NB-IoT network, a Cat-M network, or an EC-GSM network) user device. The description of operation 905 may be understood by making reference to the description of operation 425 made with reference to FIG. 4.

In operation 910, the second electronic device 200 may transmit information for registering the first external electronic device to a second external electronic device (e.g., the first server 350) through a cellular network (e.g., the network 300) or a WLAN (e.g., WiFi) using the communication circuit 210. According to an embodiment, the registration information may be transmitted through the request for the network state information. In operation 915, the second electronic device 200 may receive first network state information of the first external electronic device from the second external electronic device through the cellular network (e.g., the network 300) or a WLAN (e.g., WiFi) using the communication circuit 210. For example, the first network state information may include at least one of an indicator for indicating an inactive state of the first external electronic device, a uniform resource locator (URL) for the activation of the first external electronic device, or an application identifier. The descriptions of operation 910 and operation 915 may be understood by making reference to the descriptions of operation 430 and operation 435 made with reference to FIG. 4.

In operation 920, the second electronic device 200 may display, on the display 240, a user interface for the registration of the first external electronic device to the cellular network (e.g., LPWAN) based at least on the first network state information. The description of operation 920 may be understood by making reference to the description of operation 505 made with reference to FIG. 5.

Figure 10:
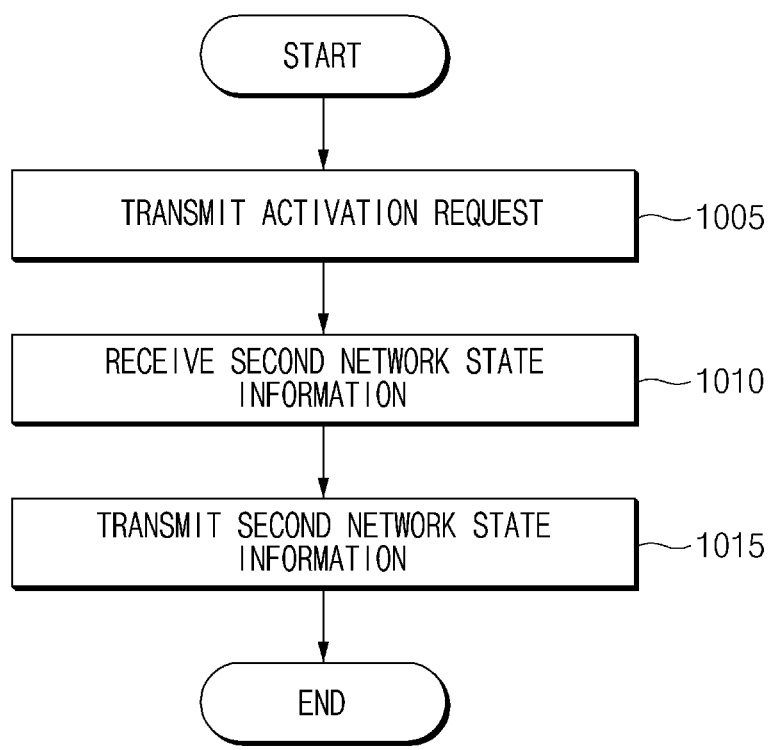
FIG. 10 is a flowchart illustrating a method for signing in a second electronic device to a network, according to an embodiment.

FIG. 10 is a flowchart illustrating a method for signing in a second electronic device to a network, according to an embodiment.

The second electronic device 200 (e.g., the processor 220) may receive a user input through the user interface provided in operation 920 of FIG. 9. For example, the second electronic device 200 may obtain a selection of information for user authentication (e.g., information for identifying the user) or information on a payment system of the first external electronic device (e.g., the first electronic device 100) through the user input.

Referring to FIG. 10, in operation 1005, the second electronic device 200 may transmit, to the service provider server (e.g., the second server 360), a request for the activation of the first external electronic device based at least on registration information of the first external electronic device and the user input through a cellular network (e.g., the network 300) or an WLAN (e.g., WiFi) using the communication circuit 210. The description of operation 1005 may be understood by making reference to the description of operation 515 made with reference to FIG. 5.

In operation 1010, the second electronic device 200 may receive second network state information corresponding to the request for the activation through a cellular network (e.g., the network 300) or a WLAN (e.g., WiFi) using the communication circuit 210. For example, the second network state information may include information (e.g., the activation, the registration, or the standby of the first external electronic device) representing the result of the request of the activation. The description of operation 1010 may be understood by making reference to the description of operation 520 made reference to FIG. 5.

In operation 1015, the second electronic device 200 may transmit the second network state information to the first external electronic device through a short-range wireless network (e.g., network 300) using the communication circuit 210. The description of operation 1015 may be understood by making reference to the description of operation 525 made with reference to FIG. 5.

Figure 11:
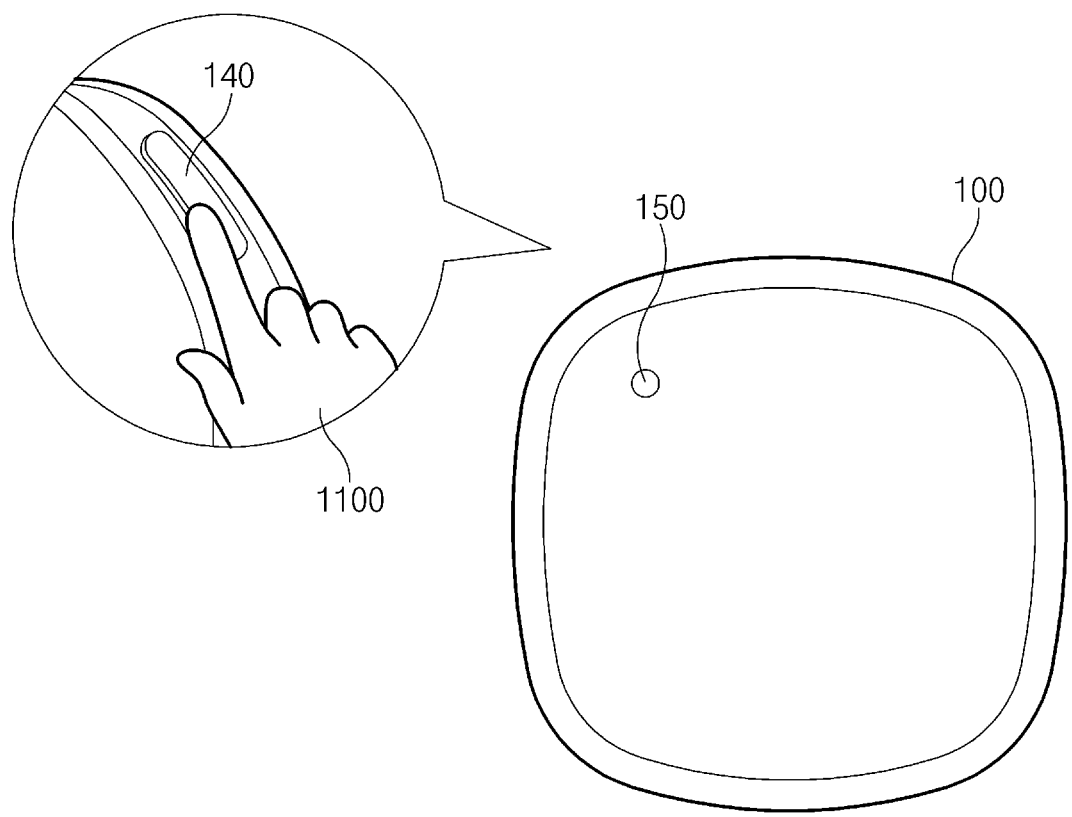
FIG. 11 is a view illustrating user input reception, according to an embodiment.

FIG. 11 illustrates the reception of the user input according to an embodiment.

According to an embodiment, the first electronic device 100 may include the user interface 140 and an indicator 150 exposed through a portion of a housing of the first electronic device 100. According to an embodiment, the user interface 140 may include at least one physical button. For example, the user interface 140 may include at least one physical button capable of receiving at least one of a push input or a touch input. According to an embodiment, a user input 1100 may include a click, a double click, a touch, and a hold for a specified time or more of a user interface 140. According to an embodiment, the indicator 150 may include a light emitting diode (LED) module. For example, the indicator 150 may be configured to out at least one color. According to an embodiment, the indicator 150 may provide a notification to a user, based on the output (e.g., the switch on and off) of light and/or the color of the output light.

According to an embodiment, to receive the user input 1100 for the pairing with the second electronic device 200, a notification may be provided for a user through the indicator 150. According to an embodiment, to receive the user input 1100, information for requesting the user input 1100 to the user interface 140 may be displayed on the display 240 of the second electronic device 200. For example, the second electronic device 200 (e.g., the processor 220) may be display, on the display 240, at least one of a text or graphic (e.g., an image similar to an image illustrated in FIG. 11) for requesting the user input 1100.

According to an embodiment, the user input 1100 may be received in the procedure of the pairing between the first electronic device 100 and the second electronic device 200. For example, the user input 1100 may be received corresponding to the reception of a message for requesting the pairing. For example, as described above with reference to FIG. 4, when the user input 1100 is received, the first electronic device 100 may transmit the registration information to the second electronic device 200.

The above description has been made with reference to FIGS. 1 to 11 regarding the IoT electronic device (e.g., the first electronic device 100) and an external electronic device (e.g., the second electronic device 200), according to various embodiments.

According to an embodiment, an electronic device (e.g., the first electronic device 100) disclosed in the present disclosure. The electronic device may include a first wireless communication circuit (e.g., a physical or logical component inside the communication circuit 110) to provide first wireless communication using a lower power wide area network (LPWAN), a second wireless communication circuit (e.g., a physical or logical component inside the communication circuit 110) to provide second wireless communication by using Wi-Fi, a third wireless communication circuit (e.g., a physical or logical component inside the communication circuit 110) to provide third wireless communication by using Bluetooth Low Energy (BLE), a user interface (e.g., the interface 140), a processor (e.g., the processor 120), and a memory (e.g., the memory 130). The processor may be electrically connected with the first, second, and third wireless communication circuits, the user interface, and the memory. The memory stores instructions that, when executed, may cause the processor to transmit a request for access to a network to the LPWAN through the first wireless communication circuit, to receive a response indicating a rejection of the request from the LPWAN through the first wireless communication circuit, to receive a user input through the user interface after receiving the response, to provide device registration information to an external mobile device (e.g., the second electronic device 200) by using the third communication circuit when the user input is received, to receive network state information from the external mobile device after providing the device registration information, and to reboot the electronic device.

For example, the user interface may include a button and a display may be absent in the user interface. For another example, the device registration information may include at least one of an IMEI, an ICCID, an IMSI, or a serial number. In addition, for another example, the network state information may include information on at least one of an unregistered state, an inactive state, an active state, a pending state, a uniform resource locator for registration of the electronic device (e.g., the first electronic device 100), or an application identifier for registration of the electronic device. For another example, the LPWAN may include at least one of an LTE-M network, a NB IoT network, and an EC-GSM network. For another example, the rebooting of the electronic device may include rebooting of at least a portion of a wireless communication circuit at least including the first wireless communication circuit, the second wireless communication circuit, and the third wireless communication circuit.

According to an embodiment, an internet of things (IoT) device (e.g., the first electronic device 100) disclosed in the present disclosure may include a housing, a communication circuit (e.g., the communication circuit 110) provided in the housing to provide first wireless communication employing an LPWAN and second wireless communication employing BLE, a physical button (e.g., the interface 140) exposed through a portion of the housing, an indicator (e.g., the indicator 150) exposed through the portion of the housing, and a processor (e.g., the processor 120) provided in the housing and electrically connected with the communication circuit, the physical button, and the indicator. The processor is configured to receive a first message from an external mobile device (e.g., the second electronic device 200) through the second wireless communication by using the communication circuit, to display a notification indicating reception of the first message through the indicator, to receive a user input to the physical button after displaying the notification, and to transmit, to the external mobile device, device registration information through the second wireless communication by using the communication circuit, so as to register the IoT device in the LPWAN, when the user input is received, to receive a second message associated with the LPWAN from the external mobile device through the second wireless communication by using the communication circuit, after transmitting the device registration information, and to access the LPWAN through the second wireless communication by using the communication circuit, based at least on the second message.

For example, the communication circuit may be further configured to provide third wireless communication using a WLAN. For another example, the processor may be configured to transmit, to the LPWAN, a request for an access to the LPWAN through the first wireless communication by using the communication circuit and to receive a response indicating a rejection of the request from the LPWAN through the first wireless communication circuit by using the communication circuit. The response indicating the rejection may include clause information indicating that the IoT device is in an unregistered state in the LPWAN. For another example, the indicator may include at least one light emitting diode (LED). For another example, the processor may be configured to reboot at least a portion of the communication circuit when the second message is received. For another example, the second message may include at least one of information on the registration of the IoT device in the LPWAN or information on an activation state of the IoT device in the LPWAN. For another example, the device registration information may include at least one of an IMEI, an ICCID, an IMSI, or a serial number.

According to an embodiment, an electronic device (e.g., the second electronic device 200) disclosed in the present disclosure may include a communication circuit (e.g., the communication circuit 210) to provide first wireless communication using a cellular network, second wireless communication using a WLAN, and third wireless communication using BLE, a display (e.g., the display 240), and a processor (e.g., the processor 220) electrically connected with the communication circuit and the display. The processor may be configured to receive registration information including an identifier of the first external electronic device through the third wireless communication from the first external electronic device (e.g., the first electronic device 100) by using the communication circuit, to transmit, to the second external electronic device (e.g., the first server 350), the registration information through the first wireless communication or the second wireless communication, by using the communication circuit, to receive, from the second external electronic device, first network state information of the first external electronic device through the first wireless communication or the second wireless communication, by using the communication circuit, and to display, on the display, a user interface for registration of the first external electronic device in an LPWAN based at least on the first network state information.

For example, the first network state information may include at least one of an indicator indicating that the first external electronic device is an inactive state, a uniform resource locator (URL) for activation of the first external electronic device, or an application identifier. For another example, the second external electronic device may be connected with a service provider server (e.g., the second server 360) while maintaining security. For another example, the processor may be configured to receive a user input through the user interface, to transmit, to the service provider server, a request for activation of the first external electronic device, based at least on the registration information and the user input through the first wireless communication or the second wireless communication, by using the communication circuit, to receive, from the second external electronic device, second network state information, which corresponds to an activation request, through the first wireless communication or the second wireless communication, by using the communication circuit, and to transmit, to the first external electronic device, the second network state information through the third wireless communication by using the communication circuit. For another example, the processor may be configured to transmit, to the service provider server, a request for sign-out of the first external electronic device through the first wireless communication or the second wireless communication, by using the communication circuit, to receive, from the second external electronic device, sign-out result information through the first wireless communication or the second wireless communication, by using the communication circuit, and to transmit, to the first external electronic device, the sign-out result information through the third wireless communication by using the communication circuit. For another example, the identifier of the first external electronic device may include at least one of an IMEI, an ICCID, an IMSI, or a serial number. For another example, the LPWAN may include at least one of an LTE-M network, a NB IoT network, and an EC-GSM network.

Hereinafter, one example of the first electronic device 100 or the second electronic device 200 which reproduces various embodiments described above with reference to FIGS. 1 to 11 will be described with reference to FIG. 12.

Figure 12:
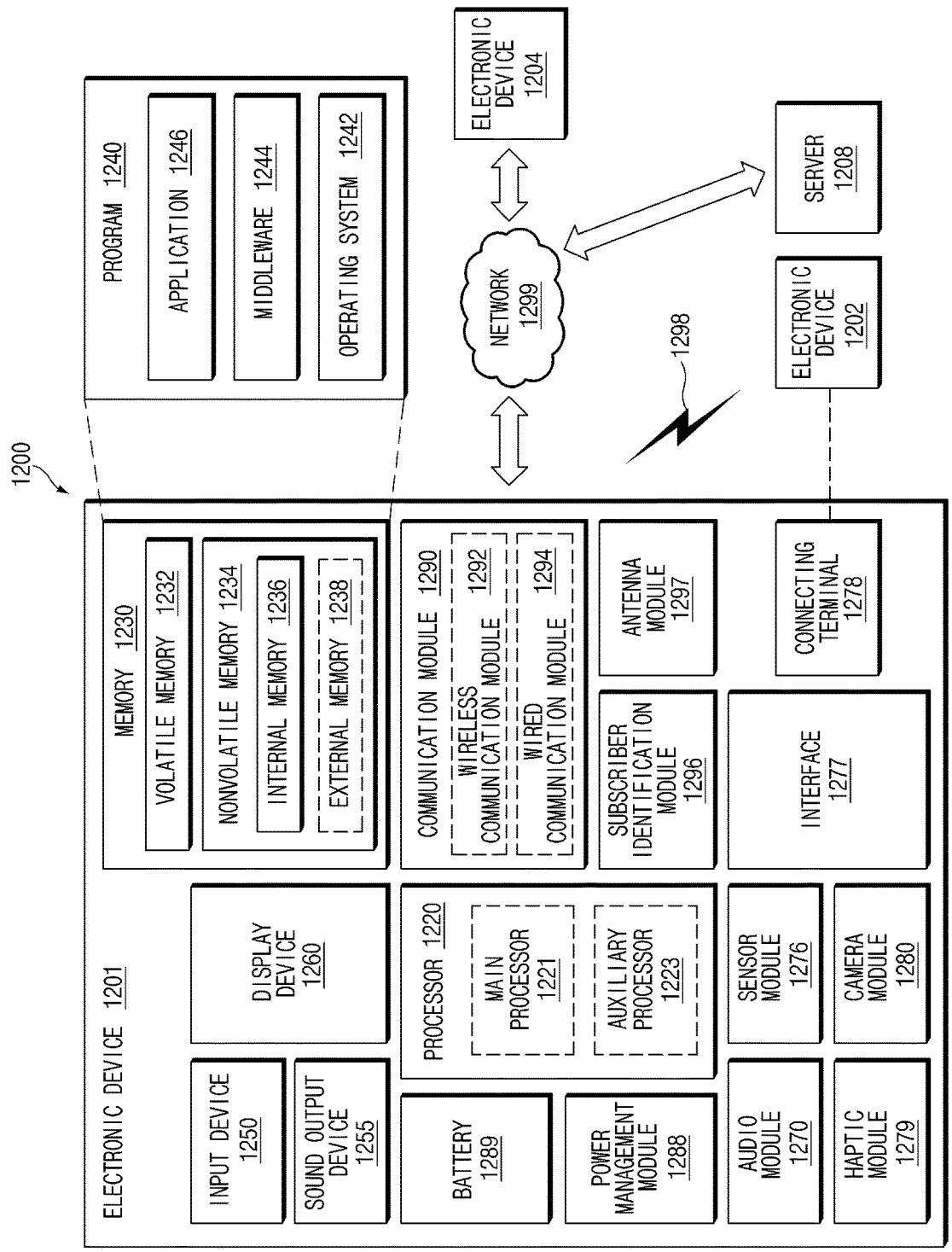
FIG. 12 is a view illustrating an electronic device within a network environment, according to various embodiments.

FIG. 12 is a block diagram of an electronic device 1201 (e.g., the first electronic device 100 or the second electronic device 200) in a network environment 1200 according to various embodiments. Referring to FIG. 12, the electronic device 1201 may communicate with an electronic device 1202 through a first network 1298 (e.g., a short-range wireless network 310) or may communicate with an electronic device 1204 or a server 1208 (e.g., the first server 350 or the second server 360) through a second network 1299 (e.g., a long-distance wireless communication) (e.g., the network 300) in the network environment 1200. According to an embodiment, the electronic device 1201 may communicate with the electronic device 1204 through the server 1208. According to an embodiment, the electronic device 1201 may include a processor 1220 (e.g., the processor 120 or the processor 22), a memory 1230 (e.g., the memory 110 or the memory 210), an input device 1250, a sound output device 1255, a display device 1260, an audio module 1270, a sensor module 1276, an interface 1277 (e.g., the user interface 140), a haptic module 1279, a camera module 1280, a power management module 1288, a battery 1289, a communication module 1290 (e.g., the communication circuit 110 or the communication circuit 210), a subscriber identification module 1296, and an antenna module 1297. According to some embodiments, at least one (e.g., the display device 1260 or the camera module 1280) among components of the electronic device 1201 may be omitted or other components may be added to the electronic device 1201. According to some embodiments, some components may be integrated and implemented as in the case of the sensor module 1276 (e.g., a fingerprint sensor, an iris sensor, or an illuminance sensor) embedded in the display device 1260 (e.g., a display).

The processor 1220 may operate, for example, software (e.g., a program 1240) to control at least one of other components (e.g., a hardware or software component) of the electronic device 1201 connected to the processor 1220 and may process and compute a variety of data. The processor 1220 may load a command set or data, which is received from other components (e.g., the sensor module 1276 or the communication module 1290), into a volatile memory 1232, may process the loaded command or data, and may store result data into a nonvolatile memory 1234. According to an embodiment, the processor 1220 may include a main processor 1221 (e.g., a central processing unit or an application processor) and an auxiliary processor 1223 (e.g., a graphic processing device, an image signal processor, a sensor hub processor, or a communication processor), which operates independently from the main processor 1221, additionally or alternatively uses less power than the main processor 1221, or is specified to a designated function. In this case, the auxiliary processor 1223 may operate separately from the main processor 1221 or embedded.

In this case, the auxiliary processor 1223 may control, for example, at least some of functions or states associated with at least one component (e.g., the display device 1260, the sensor module 1276, or the communication module 1290) among the components of the electronic device 1201 instead of the main processor 1221 while the main processor 1221 is in an inactive (e.g., sleep) state or together with the main processor 1221 while the main processor 1221 is in an active (e.g., an application execution) state. According to an embodiment, the auxiliary processor 1223 (e.g., the image signal processor or the communication processor) may be implemented as a part of another component (e.g., the camera module 1280 or the communication module 1290) that is functionally related to the auxiliary processor 1223. The memory 1230 may store a variety of data used by at least one component (e.g., the processor 1220 or the sensor module 1276) of the electronic device 1201, for example, software (e.g., the program 1240) and input data or output data with respect to commands associated with the software. The memory 1230 may include the volatile memory 1232 or the nonvolatile memory 1234.

The program 1240 may be stored in the memory 1230 as software and may include, for example, an operating system 1242, a middleware 1244, or an application 1246.

The input device 1250 may be a device for receiving a command or data, which is used for a component (e.g., the processor 1220) of the electronic device 1201, from an outside (e.g., a user) of the electronic device 1201 and may include, for example, a microphone, a mouse, or a keyboard.

The sound output device 1255 may be a device for outputting a sound signal to the outside of the electronic device 1201 and may include, for example, a speaker used for general purposes, such as multimedia play or recordings play, and a receiver used only for receiving calls. According to an embodiment, the receiver and the speaker may be either integrally or separately implemented.

The display device 1260 may be a device for visually presenting information to the user and may include, for example, a display, a hologram device, or a projector and a control circuit for controlling a corresponding device. According to an embodiment, the display device 1260 may include a touch circuitry or a pressure sensor for measuring an intensity of pressure on the touch.

The audio module 1270 may convert a sound and an electrical signal in dual directions. According to an embodiment, the audio module 1270 may obtain the sound through the input device 1250 or may output the sound through an external electronic device (e.g., the electronic device 1202 (e.g., a speaker or a headphone)) wired or wirelessly connected to the sound output device 1255 or the electronic device 1201.

The sensor module 1276 may generate an electrical signal or a data value corresponding to an operating state (e.g., power or temperature) inside or an environmental state outside the electronic device 1201. The sensor module 1276 may include, for example, a gesture sensor, a gyro sensor, a barometric pressure sensor, a magnetic sensor, an acceleration sensor, a grip sensor, a proximity sensor, a color sensor, an infrared sensor, a biometric sensor, a temperature sensor, a humidity sensor, or an illuminance sensor.

The interface 1277 may support a designated protocol wired or wirelessly connected to the external electronic device (e.g., the electronic device 1202). According to an embodiment, the interface 1277 may include, for example, an HDMI (high-definition multimedia interface), a USB (universal serial bus) interface, an SD card interface, or an audio interface.

A connecting terminal 1278 may include a connector that physically connects the electronic device 1201 to the external electronic device (e.g., the electronic device 1202), for example, an HDMI connector, a USB connector, an SD card connector, or an audio connector (e.g., a headphone connector).

The haptic module 1279 may convert an electrical signal to a mechanical stimulation (e.g., vibration or movement) or an electrical stimulation perceived by the user through tactile or kinesthetic sensations. The haptic module 1279 may include, for example, a motor, a piezoelectric element, or an electric stimulator.

The camera module 1280 may shoot a still image or a video image. According to an embodiment, the camera module 1280 may include, for example, at least one lens, an image sensor, an image signal processor, or a flash.

The power management module 1288 may be a module for managing power supplied to the electronic device 1201 and may serve as at least a part of a power management integrated circuit (PMIC).

The battery 1289 may be a device for supplying power to at least one component of the electronic device 1201 and may include, for example, a non-rechargeable (primary) battery, a rechargeable (secondary) battery, or a fuel cell.

The communication module 1290 may establish a wired or wireless communication channel between the electronic device 1201 and the external electronic device (e.g., the electronic device 1202, the electronic device 1204, or the server 1208) and support communication execution through the established communication channel. The communication module 1290 may include at least one communication processor operating independently from the processor 1220 (e.g., the application processor) and supporting the wired communication or the wireless communication. According to an embodiment, the communication module 1290 may include a wireless communication module 1292 (e.g., a cellular communication module, a short-range wireless communication module, or a GNSS (global navigation satellite system) communication module) or a wired communication module 1294 (e.g., an LAN (local area network) communication module or a power line communication module) and may communicate with the external electronic device using a corresponding communication module among them through the first network 1298 (e.g., the short-range communication network such as a Bluetooth, a WiFi direct, Bluetooth low energy (BLE) or an IrDA (infrared data association)) or the second network 1299 (e.g., the long-distance wireless communication network such as a cellular network, an internet, or a computer network (e.g., LAN or WAN)). The above-mentioned various communication modules 1290 may be implemented into one chip or into separate chips, respectively.

According to an embodiment, the wireless communication module 1292 may identify and authenticate the electronic device 1201 using user information stored in the subscriber identification module 1296 in the communication network.

The antenna module 1297 may include one or more antennas to transmit or receive the signal or power to or from an external source. According to an embodiment, the communication module 1290 (e.g., the wireless communication module 1292) may transmit or receive the signal to or from the external electronic device through the antenna suitable for the communication method.

Some components among the components may be connected to each other through a communication method (e.g., a bus, a GPIO (general purpose input/output), an SPI (serial peripheral interface), or an MIPI (mobile industry processor interface)) used between peripheral devices to exchange signals (e.g., a command or data) with each other.

According to an embodiment, the command or data may be transmitted or received between the electronic device 1201 and the external electronic device 1204 through the server 1208 connected to the second network 1299. Each of the electronic devices 1202 and 1204 may be the same or different types as or from the electronic device 1201.

According to an embodiment, all or some of the operations performed by the electronic device 1201 may be performed by another electronic device or a plurality of external electronic devices. When the electronic device 1201 performs some functions or services automatically or by request, the electronic device 1201 may request the external electronic device to perform at least some of the functions related to the functions or services, in addition to or instead of performing the functions or services by itself. The external electronic device receiving the request may carry out the requested function or the additional function and transmit the result to the electronic device 1201. The electronic device 1201 may provide the requested functions or services based on the received result as is or after additionally processing the received result. To this end, for example, a cloud computing, distributed computing, or client-server computing technology may be used.

The electronic device according to various embodiments disclosed in the present disclosure may be various types of devices. The electronic device may include, for example, at least one of a portable communication device (e.g., a smartphone), a computer device, a portable multimedia device, a mobile medical appliance, a camera, a wearable device, or a home appliance. The electronic device according to an embodiment of the present disclosure should not be limited to the above-mentioned devices.

It should be understood that various embodiments of the present disclosure and terms used in the embodiments do not intend to limit technologies disclosed in the present disclosure to the particular forms disclosed herein; rather, the present disclosure should be construed to cover various modifications, equivalents, and/or alternatives of embodiments of the present disclosure. With regard to description of drawings, similar components may be assigned with similar reference numerals. As used herein, singular forms may include plural forms as well unless the context clearly indicates otherwise. In the present disclosure disclosed herein, the expressions "A or B", "at least one of A or/and B", "A, B, or C" or "one or more of A, B, or/and C", and the like used herein may include any and all combinations of one or more of the associated listed items. The expressions "a first", "a second", "the first", or "the second", used in herein, may refer to various components regardless of the order and/or the importance, but do not limit the corresponding components. The above expressions are used merely for the purpose of distinguishing a component from the other components. It should be understood that when a component (e.g., a first component) is referred to as being (operatively or communicatively) "connected," or "coupled," to another component (e.g., a second component), it may be directly connected or coupled directly to the other component or any other component (e.g., a third component) may be interposed between them.

The term "module" used herein may represent, for example, a unit including one or more combinations of hardware, software and firmware. The term "module" may be interchangeably used with the terms "logic", "logical block", "part" and "circuit". The "module" may be a minimum unit of an integrated part or may be a part thereof. The "module" may be a minimum unit for performing one or more functions or a part thereof. For example, the "module" may include an application-specific integrated circuit (ASIC).

Various embodiments of the present disclosure may be implemented by software (e.g., the program 1240) including an instruction stored in a machine-readable storage media (e.g., an internal memory 1236 or an external memory 1238)

readable by a machine (e.g., a computer). The machine may be a device that calls the instruction from the machine-readable storage media and operates depending on the called instruction and may include the electronic device (e.g., the electronic device 1201). When the instruction is executed by the processor (e.g., the processor 1220), the processor may perform a function corresponding to the instruction directly or using other components under the control of the processor. The instruction may include a code generated or executed by a compiler or an interpreter. The machine-readable storage media may be provided in the form of non-transitory storage media. Here, the term "non-transitory", as used herein, is a limitation of the medium itself (i.e., tangible, not a signal) as opposed to a limitation on data storage persistency.

According to an embodiment, the method according to various embodiments disclosed in the present disclosure may be provided as a part of a computer program product. The computer program product may be traded between a seller and a buyer as a product. The computer program product may be distributed in the form of machine-readable storage medium (e.g., a compact disc read only memory (CD-ROM)) or may be distributed only through an application store (e.g., a Play Store™). In the case of online distribution, at least a portion of the computer program product may be temporarily stored or generated in a storage medium such as a memory of a manufacturer's server, an application store's server, or a relay server.

Each component (e.g., the module or the program) according to various embodiments may include at least one of the above components, and a portion of the above sub-components may be omitted, or additional other sub-components may be further included. Alternatively or additionally, some components (e.g., the module or the program) may be integrated in one component and may perform the same or similar functions performed by each corresponding components prior to the integration. Operations performed by a module, a programming, or other components according to various embodiments of the present disclosure may be executed sequentially, in parallel, repeatedly, or in a heuristic method. Also, at least some operations may be executed in different sequences, omitted, or other operations may be added.

What is claimed is:

1. An electronic device comprising:
   a first wireless communication circuit configured to provide first wireless communication using a lower power wide area network (LPWAN);
   a second wireless communication circuit configured to provide second wireless communication by using Wi-Fi;
   a third wireless communication circuit configured to provide third wireless communication by using Bluetooth Low Energy (BLE);
   a user interface;
   a processor operatively connected with the first wireless communication circuit, the second wireless communication circuit, the third wireless communication circuit, and the user interface; and
   a memory electrically connected with the processor,
   wherein the memory stores instructions that, when executed, cause the processor to:
   transmit, to the LPWAN, a request for an access to a network, through the first wireless communication circuit;
   receive a response indicating a rejection of the request from the LPWAN through the first wireless communication circuit;
   receive a user input through the user interface after receiving the response;
   provide device registration information to an external mobile device by using the third wireless communication circuit when the user input is received;
   receive network state information from the external mobile device after providing the device registration information; and
   reboot the electronic device.

2. The electronic device of claim 1, wherein the user interface includes a button and a display is absent in the user interface.

3. The electronic device of claim 1, wherein the device registration information includes at least one of an international mobile equipment identity (IMEI), an Integrated circuit card identifier (ICCID), an international mobile subscriber identity (IMSI), or a serial number.

4. The electronic device of claim 1, wherein the network state information includes information on at least one of an unregistered state, an inactive state, an active state, a pending state, a uniform resource locator for registration of the electronic device, or an application identifier for the registration of the electronic device.

5. The electronic device of claim 1, wherein the LPWAN includes at least one of a long term evolution-machine type communication (LTE-M) network, a narrowband Internet of things (NB IoT) network, and an extended coverage-global system for mobile communication for IoT (EC-GSM) network.

6. The electronic device of claim 1, wherein the rebooting of the electronic device includes rebooting of at least a portion of a wireless communication circuit including the first wireless communication circuit, the second wireless communication circuit, and the third wireless communication circuit.

7. The electronic device of claim 1, further comprising:
   a housing; and
   an indicator exposed through the portion of the housing, and
   wherein the user interface is a physical button exposed through at least a part of the housing.

8. The electronic device of claim 7, wherein the indicator comprises at least one light emitting diode.

9. A method for activating an electronic device comprising:
   transmitting, to a lower power wide area network (LPWAN), LPWAN, a request for an access to the LPWAN;
   receiving a response indicating a rejection of the request from the LPWAN;
   receiving a user input through a user interface of the electronic device after receiving the response;
   providing device registration information to an external mobile device through a Bluetooth low energy communication when the user input is received;
   receiving network state information from the external mobile device after providing the device registration information; and
   rebooting the electronic device.

10. The method of claim 9, wherein the user interface includes a button without a display.

11. The method of claim 9, wherein the device registration information includes at least one of an international mobile equipment identity (IMEI), an Integrated circuit card identifier (ICCID), an international mobile subscriber identity (IMSI), or a serial number.

12. The method of claim 9, wherein the network state information includes information on at least one of an unregistered state, an inactive state, an active state, a pending state, a uniform resource locator for registration of the electronic device, or an application identifier for the registration of the electronic device.

13. The method of claim 9, wherein the LPWAN includes at least one of a long term evolution-machine type communication (LTE-M) network, a narrowband Internet of things (NB IoT) network, and an extended coverage-global system for mobile communication for IoT (EC-GSM) network.

14. The method of claim 9, wherein the user interface is a physical button exposed through at least a part of a housing of the electronic device.

15. The method of claim 9, further comprising:
   notifying a reception of the response through the indicator after receiving the response,
   wherein the indicator includes at least one light emitting diode.

* * * * *